US006249642B1

(12) United States Patent
Lewis et al.

(10) Patent No.: US 6,249,642 B1
(45) Date of Patent: *Jun. 19, 2001

(54) EXTENDED PLAY RADIO VISION CASSETTE RECORDER SYSTEM AND METHOD OF OPERATING SAME

(75) Inventors: Richard A. Lewis, El Segundo; James M. Anderson, Huntington Beach, both of CA (US)

(73) Assignee: TRW Inc., Redondo Beach, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/864,637

(22) Filed: May 28, 1997

(51) Int. Cl.⁷ .................................................. H04N 5/91
(52) U.S. Cl. .................. 386/96; 386/49; 386/95; 386/104; 386/26; 386/29; 348/484; 348/731; 348/473; 348/729; 455/45; 327/105; 331/18
(58) Field of Search .................. 386/46, 95, 96, 386/104, 26, 29; 348/484, 731, 473, 729; 455/45; 327/105; 331/18; H04N 5/76

(56) References Cited

U.S. PATENT DOCUMENTS

| 3,696,297 | 10/1972 | Otero . |
| 4,047,170 | 9/1977 | Miller . |
| 4,109,115 | 8/1978 | Yamamoto . |
| 4,268,724 | 5/1981 | Hubbard . |

(List continued on next page.)

FOREIGN PATENT DOCUMENTS

| 4214979 | 11/1992 | (DE) . |
| 0472119 | 2/1992 | (EP) . |
| 0718844 | 6/1996 | (EP) . |
| 0797322 | 9/1997 | (EP) . |
| 2166278A | * 4/1986 | (GB) . |
| 05153449 | 9/1993 | (JP) . |
| 6-209445 | 7/1994 | (JP) . |
| 0096529 | 12/1984 | (WO) . |
| 9508245 | 3/1995 | (WO) . |
| 9621287 | 7/1996 | (WO) . |

*Primary Examiner*—Huy Nguyen
(74) *Attorney, Agent, or Firm*—Michael S. Yatsko (57) ABSTRACT

An extended play radio video cassette recorder (EPRVCR) capable of receiving and recording audio and video signals transmitted over a radio frequency channel is provided. The EPRVCR includes a videocassette recorder (VCR) and a tuner capable of receiving of radio frequency signals and television frequency signals electrically connected to the VCR. Method for broadcasting and receiving a composite video and audio signal over a radio frequency for subsequent recording by an extended play radio video cassette recorder is also provided. The method includes the steps of providing a VCR having a tuner capable of receiving radio frequency signals; broadcasting audio on a preselected baseband radio frequency; broadcasting a visual image on a subcarrier sideband of the preselected baseband frequency; and receiving the audio and visual image using the tuner of the VCR. The VCR is also capable of recording the audio and video image simultaneously onto a single video cassette. The EPRVCR is also capable of playing the audio and visual image through the VCR for display on a monitor. In an embodiment, the tuner is a direct digital frequency synthesis tuner.

12 Claims, 5 Drawing Sheets

U.S. PATENT DOCUMENTS

| | | |
|---|---|---|
| 4,287,533 | 9/1981 | Schwab et al. . |
| 4,310,854 * | 1/1982 | Baer .................................... 348/484 |
| 4,387,271 | 6/1983 | Artom . |
| 4,423,444 | 12/1983 | Humphreys . |
| 4,435,845 | 3/1984 | Timm et al. . |
| 4,519,008 | 5/1985 | Takenouchi et al. . |
| 4,532,502 | 7/1985 | Menezes et al. . |
| 4,742,516 | 5/1988 | Yamaguchi . |
| 4,797,750 | 1/1989 | Karweit . |
| 4,803,560 | 2/1989 | Matsunaga et al. . |
| 4,821,270 | 4/1989 | Mauge . |
| 4,887,308 | 12/1989 | Dutton . |
| 4,972,275 | 11/1990 | Spitz et al. . |
| 4,992,782 | 2/1991 | Sakamoto et al. . |
| 5,010,419 | 4/1991 | Heidt et al. . |
| 5,023,934 * | 6/1991 | Wheeless ............................. 455/45 |
| 5,063,610 | 11/1991 | Alwadish . |
| 5,070,404 * | 12/1991 | Bullock et al. ...................... 348/473 |
| 5,146,612 * | 9/1992 | Grosjean et al. .................... 348/729 |
| 5,213,337 | 5/1993 | Sherman . |
| 5,214,792 | 5/1993 | Alwadish . |
| 5,233,438 | 8/1993 | Funahashi et al. . |
| 5,241,538 * | 8/1993 | Kanno et al. ........................ 348/484 |
| 5,341,253 | 8/1994 | Liao et al. . |
| 5,444,720 | 8/1995 | Schwaiger . |
| 5,455,636 * | 10/1995 | Furrey et al. ....................... 348/731 |
| 5,465,240 | 11/1995 | Mankovitz . |
| 5,488,427 | 1/1996 | Kayashima et al. . |
| 5,489,894 | 2/1996 | Murray . |
| 5,541,737 | 7/1996 | Oguro et al. . |
| 5,561,849 | 10/1996 | Mankovitz . |
| 5,630,103 | 5/1997 | Smith et al. . |
| 5,764,087 * | 6/1998 | Clark .................................. 327/105 |
| 5,859,570 * | 1/1999 | Itoh et al. ............................ 331/18 |

* cited by examiner

EXTENDED PLAY RADIO VISION CASSETTE RECORDER SYSTEM AND METHOD OF OPERATING SAME

BACKGROUND OF THE INVENTION

The present invention relates generally to recording and more specifically to an extended play radio and video cassette recorder system and method of operating same to provide extended recording of audio and video images on a single video cassette.

The consumer electronics field is virtually limitless when it comes to products available for performing a number of tasks with audio and/or video. For example, cassette recorders or audio cassette tape decks have existed for many years and provide the capability of taping audio programs or music onto a small cassette tape. However, even state of the art cassette recorders are limited in dynamic range and signal-to-noise ratios. For example, a high-end consumer cassette deck typically has a signal-to-noise ratio of approximately 60–65 dB. Cassette tape decks also typically feature the capability of recording approximately 100 minutes of audio.

Another example of an audio-only tape recorder is a radio cassette recorder. At present, there are several recording radios on the market manufactured by companies such as Sony, Radio Shack and Sagien. Current radio cassette recorders are based upon the standard audio cassette deck formats. These units typically feature a radio and a built-in audio cassette recorder that provides recording capacity of approximately 100 minutes similar to standard tape decks. However, standard cassette decks and radio cassette recorders have many shortcomings. For example, many radio programs run several hours and some disc jockeys are on the air for shifts of approximately six hours. Unfortunately, known audio and radio cassette recorders are limited to a recording time of approximately two hours. Therefore, the need exists for an apparatus for recording extended length radio broadcasts.

Although currently available state of the art radio cassette recorders offer a timer feature for unattended automatic recording, the audio cassette format inherently limits the length of the recording by the size of the typical audio cassette. Many such models only record on one side of a 90 minute cassette, thereby requiring the recordist manually to change or reverse the cassette. The high-end radio recorders offer an auto-reverse feature which flips the tape automatically and continues recording for the entire length of the tape, typically 90 minutes. Thus, a limitation of length of recording is encountered using standard audio cassettes. As an example, four audio cassettes would be required to record a six hour radio program. Such a taping process not only requires excessive operator intervention in monitoring and performing three tape changes, but also creates storage and archival space problems.

Another problem with known systems is that the audio cassette decks typically have non-linear counters and offer rather limited search functions of the cassettes. These counters typically provide only a numeric read-out which does not easily translate to the recording time in hours, minutes and seconds.

Current hi-fi video cassette recorders (VCRs) offer an alternative for taping long periods of video programs. VCRs provide a much longer recording time via the longer video cassettes. For example, a 180 minute VHS cassette can be run in the extended play (EP) mode to provide 9 hours of recording. As an additional benefit, hi-fi VCRs provide a greater dynamic range (approximately 90 dB) which far exceeds that of audio cassette tape decks. Typical VCRs also offer improved counters, including hour, minute, second-type counters which also offer better indexing features and facilitate quick and easy access to specific portions of a recording.

However, VCRs are also limited. Some VCRs may not have a tuner if designed only for taping and playback. Further, the current VCRs which include tuners are unable to receive radio frequency signals from radio stations, etc.

Thus, a need exists for recording radio audio programs, as well as video, while providing much longer recording times and improved features including better access to particular points in the recording.

BRIEF SUMMARY OF THE INVENTION

With the above-discussed disadvantages in mind, an embodiment of the present invention provides an extended play radio video cassette recorder (EPRVCR) capable of receiving radio frequency signals from radio stations as well as video information transmitted on a subband or subcarrier of the radio station channel for subsequent recording on the EPRVCR for up to 9 hours at a time.

An embodiment of the EPRVCR includes a 19 micron head VHS type transport in combination with a world band radio receiver having a direct access digital tuner with multiple memory presets and a remote control. In addition, standard VCR features such as multiple event, extended period timers are included, as well as stereo audio and video inputs and a stereo headphone output. Also, line level stereo audio outputs are provided. In addition, a telescopic antenna and terminals for a connection of external antennas, including co-axial FM 75 ohm, FM 300 ohm and AM are provided. In addition, a single radio and video output using an RCA connector is provided. A front panel signal strength meter is also available to aid in the operation of the EPRVCR 100. Peripheral equipment such as powered compact speakers or a video monitor can be provided.

A method of recording a video image and a radio signal on a single recording media using a video cassette recorder (VCR) is also provided. The method comprises the steps of: providing a VCR having a tuner capable of receiving a radio frequency signal transmitted by a radio station transmitter; receiving the radio frequency signal using the tuner of the VCR; recording the radio frequency signal onto a video cassette using the VCR; and recording a video image onto the video cassette.

An embodiment of the present invention provides the advantage of a new audio and visual media especially directed to the radio industry for enhancing current product capabilities of radio. The EPRVCR increases the enjoyment and information levels of radio as well as the potential for improved advertising comparable to TV.

An embodiment of the EPRVCR provides the advantage of increased recording capacity over standard audio cassette formats as well as an increase in bandwidth and dynamic range. For example the bandwidth is improved to approximately 20 Hz-20 kHz compared with 45 Hz-15 kHz as in standard audio cassettes. The dynamic range is also improved from approximately 65 dB to approximately 90 dB.

An embodiment of the EPRVCR of the present invention also provides a multiple event timer as well as real-time search capability by hour, minute, second instead of simple numeric counters present on most audio cassette decks.

Furthermore, the EPRVCR incorporates a direct access scanning digital tuner with memory functions (presets). The tuner uses digital frequency synthesis just like a VCR. The implication of using this common type of tuner is that radio bands can be picked up by changing the rate at which the wave table is cycled. In other words, an embodiment of the EPRVCR can pick up all the world band radio frequencies/ bands by appropriately changing the control settings in the digital frequency synthesis module which is a microprocessor component. When so configured, the EPRVCR provides access to that channel.

In addition, timed event recordings are possible by using similar methods to those of current VCRs. The commands are typically inputted via a hand-held remote control or via controls on the front face of the EPRVCR. When an optional CRT module is provided, on-screen programming display capabilities much like those used on current VCRs are possible.

The EPRVCR system may be used in several ways. First, the EPRVCR may be a stand-alone unit having an LCD readout. A radio station broadcasts an image of its call letters or a logo on a subcarrier sideband which is displayed on the LCD of the EPRVCR when that radio station is tuned in so that the user knows which channel is playing.

Secondly, the EPRVCR system may be used to broadcast an image of a product being advertised on an audio commercial on the radio. The video image is transmitted on the radio audio subcarrier sideband while the product is being advertised on the radio. Thus, the visual image is displayed during the audio advertisement.

Third, the EPRVCR may enable a user to watch pre-recorded visuals. A videocassette given or sold to the user is initially provided with visual images. After the recording of audio on the tape, the user plays back both the audio and pre-recorded visual images.

Further, the EPRVCR could be connected through a home entertainment center directly to a TV so that the audio from the radio station as well as the video contained in the sidebands of the radio channel are experienced in real-time. The audio and video may or may not be simultaneously recorded as it passes through the EPRVCR. Thus, in a real-time radio broadcast, the radio station transmits the audio portion on its radio frequency and the video portion on a subcarrier. The video portion may contain programming information or products being advertised.

The EPRVCR system of the present invention provides an advantage over various other methods in which radio and TV have been used together. For example, a simulcast of a concert on a television station requires a radio channel to be totally dedicated to replaying the audio portion of the concert. However, this type of simulcast requires two full bands, one full TV band and one full radio band, to be carried out. The EPRVCR system of the present invention uses only a single radio channel, broadcasting the audio on the baseband radio channel and the video on the subcarrier sideband of the same radio channel.

DETAILED DESCRIPTION OF THE INVENTION

Figure 1:
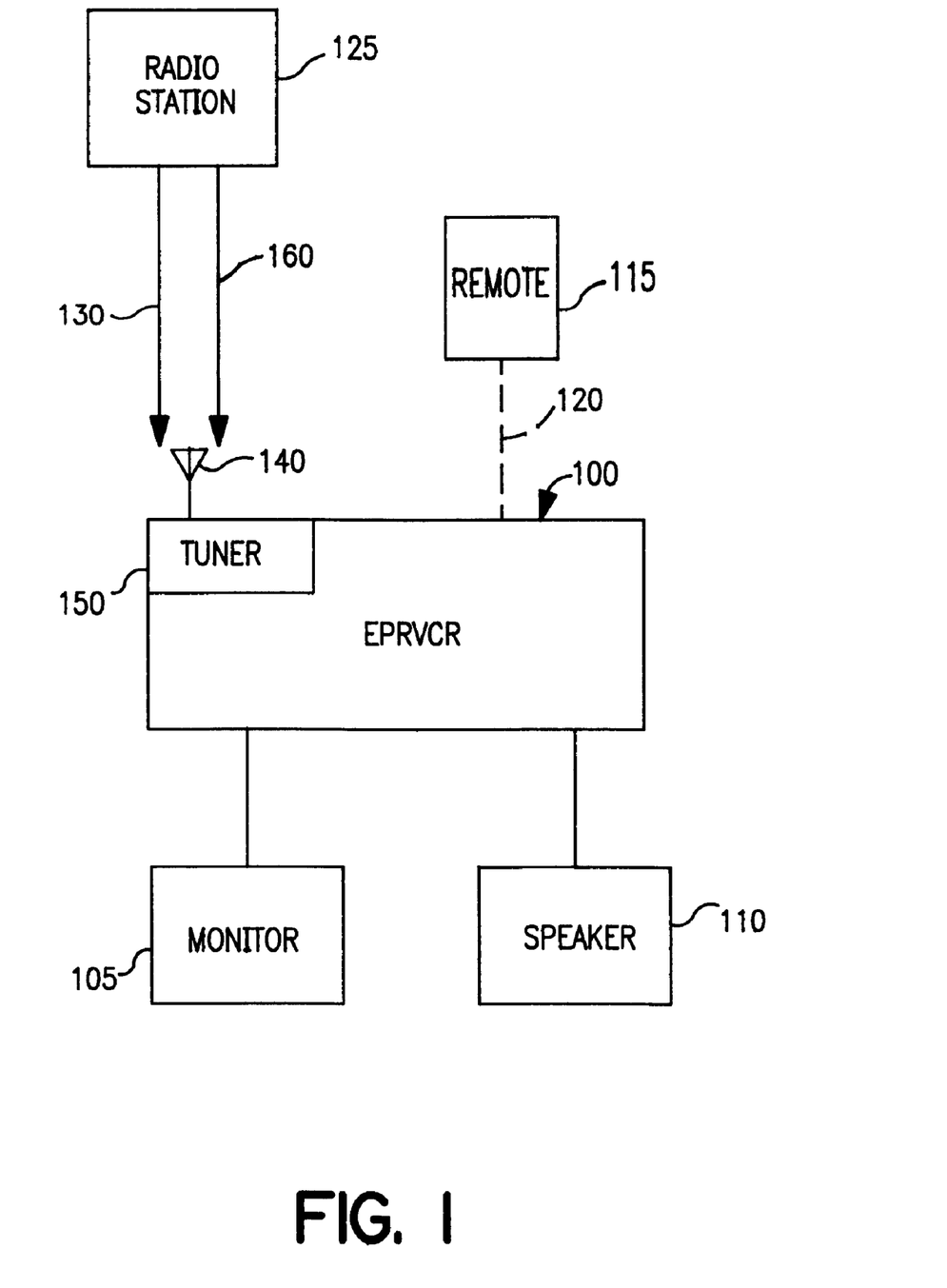
FIG. 1 is a block diagram of a system incorporating an embodiment of an extended play radio video cassette recorder (EPRVCR) in an environment of use illustrating the EPRVCR receiving radio and video signals from a radio station.

FIG. 1 illustrates an embodiment of an extended play radio video cassette recorder (EPRVCR) designated generally at 100. The EPRVCR 100 is preferably connected to a video monitor or television (TV) 105 and speakers 110. The video monitor 105 may alternatively include the speakers 110. Also the speakers 110 may be self-powered, stand-alone type units. For convenience of operation, the EPRVCR 100 may also be controlled by a remote control 115. The remote control 115 is preferably wireless and operates using an infrared or RF communication link 120 illustrated by a dashed line. The remote control 115 is describer further below with respect to FIG. 4.

FIG. 1 also illustrates a radio station 125. The radio station 125 transmits a radio frequency signal referenced at 130 on a designated frequency corresponding to the radio station's assigned channel frequency. The EPRVCR 100 is preferably provided with an antenna 140 capable of detecting the radio signal 130 transmitted by the radio station 125. The EPRVCR 100 includes a tuner 150 described further below with reference to FIG. 2. Unlike most video cassette recorders, the tuner 150 of the EPRVCR 100 is capable of receiving radio signals from world band radio frequency broadcasts, including AM/FM/SW/SSB signals. These signals are outside the range of current VCR tuners. As a result, the VCRs are not capable of tuning in such radio signals for playback through the VCR or recording.

Additionally, in an embodiment of the EPRVCR system of the present invention, the radio station 125 transmits a video signal 160. The video signal 160 is transmitted on a subcarrier sideband of the channel on which the radio audio signal 130 is concurrently being broadcast. Broadcasting on the sidebands has been approved by the FCC. Thus, the EPRVCR of the present invention beneficially utilizes the arrangement of the radio frequency and its subcarrier sidebands for simultaneous audio and video transmission, respectively.

The video signal 160 may be as simple as a still image of the radio station's call letters or logo, for example. However, a multitude of various images are possible. For example, traffic and/or weather images may be provided to supplement and correspond with the audio signal 130 being transmitted by the radio station 125. In addition video artwork may also be captured and sent on the subcarrier sidebands of the radio channel. The corresponding audio and video signals 130, 160 respectively are complementary and add to the information content of the broadcast from the radio station 125.

As an example, a listener/viewer can be listening to the radio audio portion 130 broadcast by the radio station 125, and when a topic of particular interest to the listener is broadcast, the listener can look at the monitor 105 which is concurrently displaying the visual image. The supplemental video image 160 corresponds to the topic of interest being discussed, therefore, illustratively adds to the audio portion 130 in content and explanatory detail.

In addition, radio advertising may be enhanced by providing the radio audio signal 130 with the accompanying video image 160 of a product being advertised at the same time. The listener/viewer can then see what is being offered.

Such a system puts the radio industry in the same basic class as TV. Once the audio image 130 and video image 160 are received at the EPRVCR 100, the resulting combined image may be recorded on a single videocassette using the EPRVCR 100. Also, the combined image may be transmitted to the monitor 105 for real-time display or subsequent playback. The speakers 110 may also be used for reproducing the audio portion 130. Such operations may be controlled by the remote control 115.

An embodiment of the EPRVCR 100 of the present invention integrates a VHS format cassette transport having 19 micron head technology with a worldband radio. Both share a common microprocessor/controller. The EPRVCR 100 permits uninterrupted hi-fi recordings of radio signals as well as other hi-fi audio sources via the auxiliary audio inputs for up to 9 hours using a 180 minute VHS cassette. This is accomplished by running the cassette tape in the EP (extended play) mode.

Figure 2:
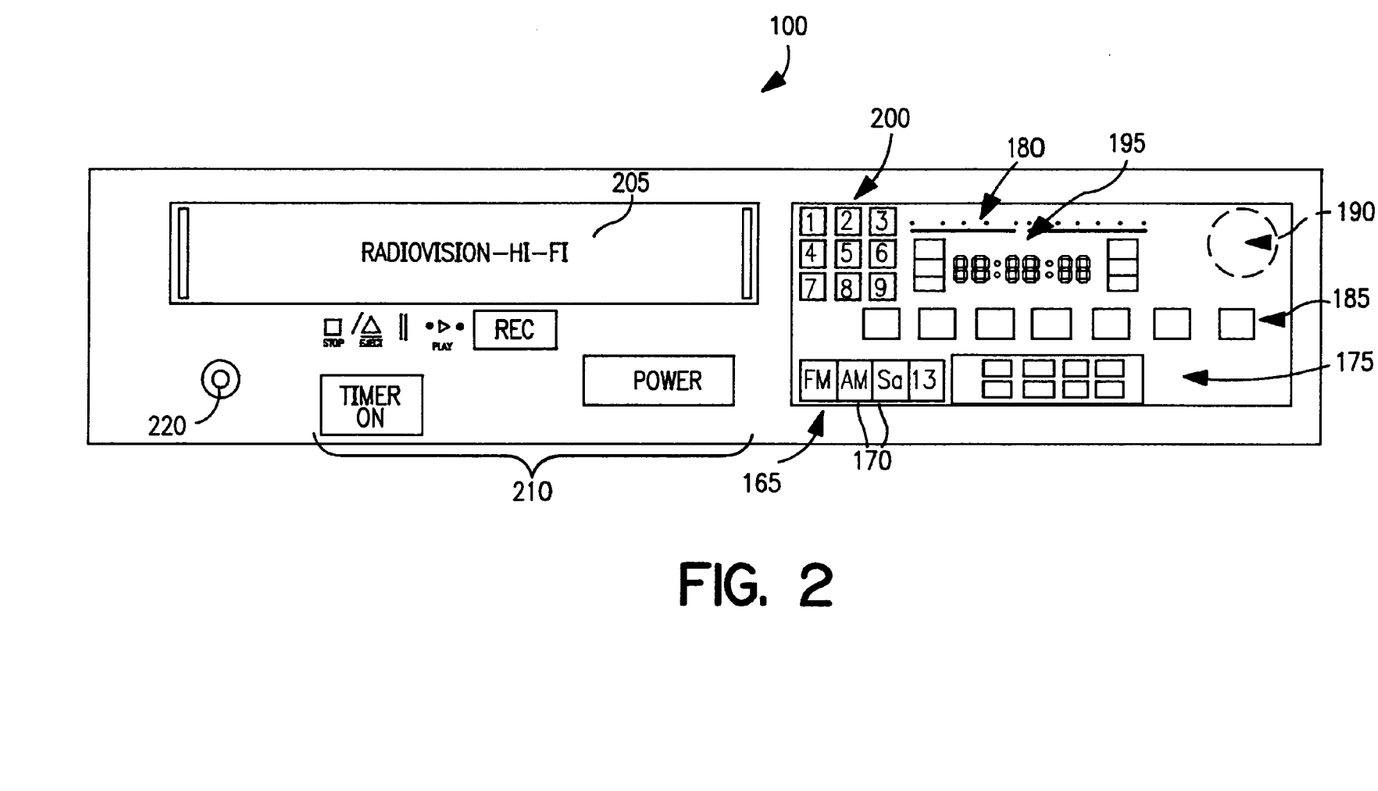
FIG. 2 is a front view of an embodiment of the EPRVCR of FIG. 1.

FIG. 2 illustrates an embodiment of the EPRVCR 100. Numerous components of the EPRVCR 100 as well as various features are illustrated in FIG. 2. While the EPRVCR 100 is similar to a standard VCR in many respects, certain modifications, however, are necessary. These modifications include the modification of the tuner 150.

Direct digital frequency synthesis (DDFS) is presently used in the industry. As set forth above, the tuner 150 in the embodiment of the EPRVCR 100 is capable of receiving radio signals from the entire band of radio frequencies. The EPRVCR 100 can receive and record several types of inputs, for example, AM, FM, SW and SSB. To select between the various inputs, an input selector 165 is provided and includes a plurality of buttons 170. The buttons 170 correspond to the inputs and include, for example, AM, FM, SW and SSB. The input selector 165 is preferably located on a control panel 180 on the front of the EPRVCR 100. A tuner display 175 indicates to the user which input has been selected by using the buttons 170 on the input selector 165, for example.

The control panel 180 also includes a radio signal strength meter 185 to aid in fine tuning a radio station. An infrared sensor 190 is also conveniently located on the front face of the EPRVCR 100 so that the remote control 115 can communicate with the EPRVCR 100 over the infrared frequency communication link 120, for example. The front control panel 180 of the EPRVCR 100 also includes a tape display 195 which includes standard displays related to various recording operations of the EPRVCR 100. Also, the control panel 180 includes a preset selector/display 200 for selecting, memorizing and indicating a favorite or particular preset channel or radio station.

Various other features common to most VCRs are provided, including a cassette loading slot 205, tape operation buttons 210 including a stop/eject, a play, a record and power button are included. Additional tape operation buttons 210 are also possible. A timer button 215 is included as well as a headphone jack 220 for use by the listener. All currently known VCR features and future enhancements may of course be incorporated into the EPRVCR 100.

Figure 3:
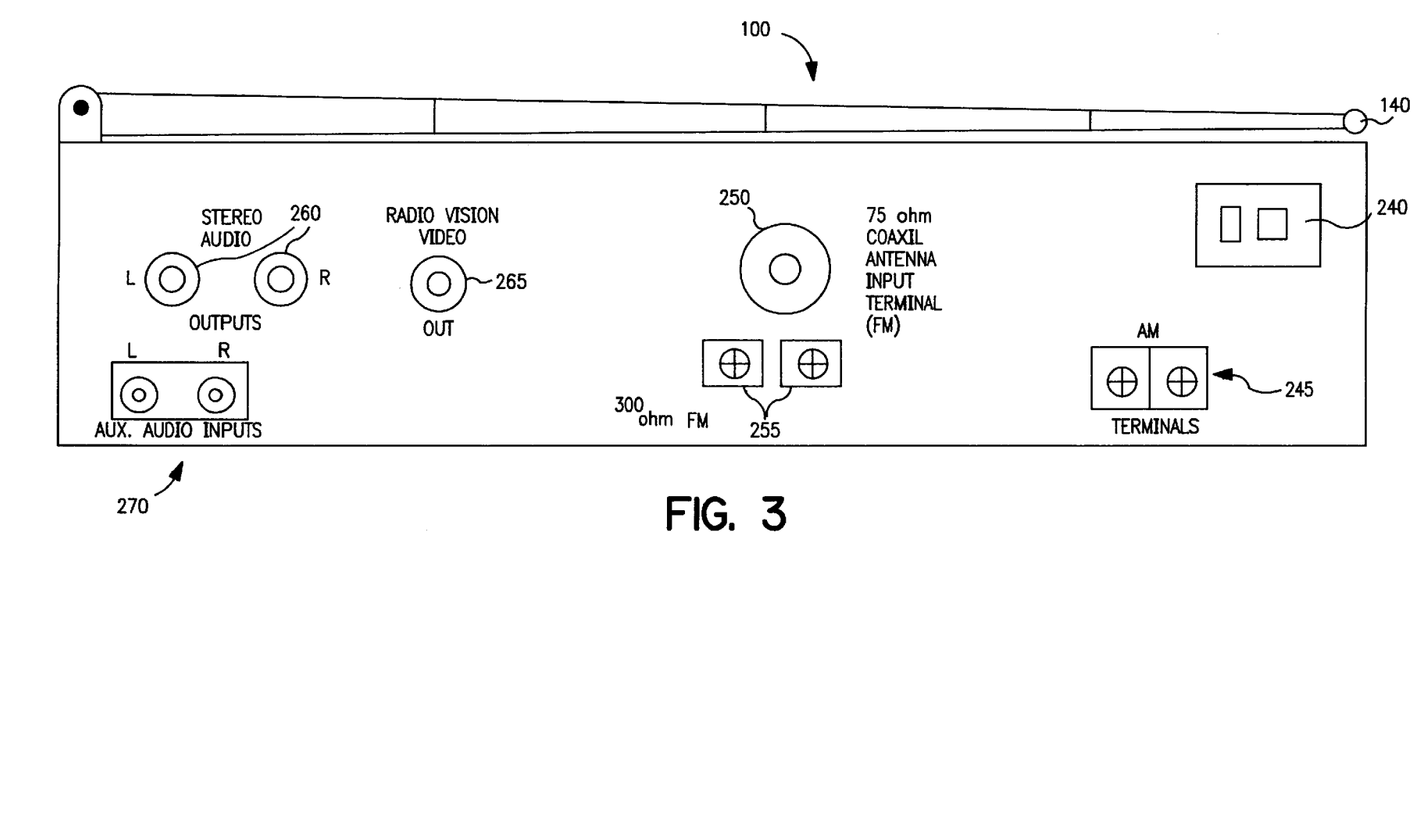
FIG. 3 is a back view of an embodiment of the EPRVCR of FIG. 1.

FIG. 3 illustrates a back view of an embodiment of the EPRVCR 100 of FIGS. 1 and 2. The antenna 140 mentioned above with respect to FIG. 1 is shown. The antenna 140 is capable of receiving FM/SW/SSB input transmissions. The antenna 140 is also preferably a retractable telescopic type. Basic connections are located on the back of the EPRVCR 100 and include an AC power cord 240, connection terminals 245 for AM reception as well as a 75 ohm coaxial antenna input terminal 250 and a 300 ohm connection terminal 255, both for FM reception. Stereo audio outputs 260 for left and right channels are also provided. A radio video output connection 265 and left and right auxiliary audio inputs 270 are provided using standard RCA type connectors.

Figure 4:
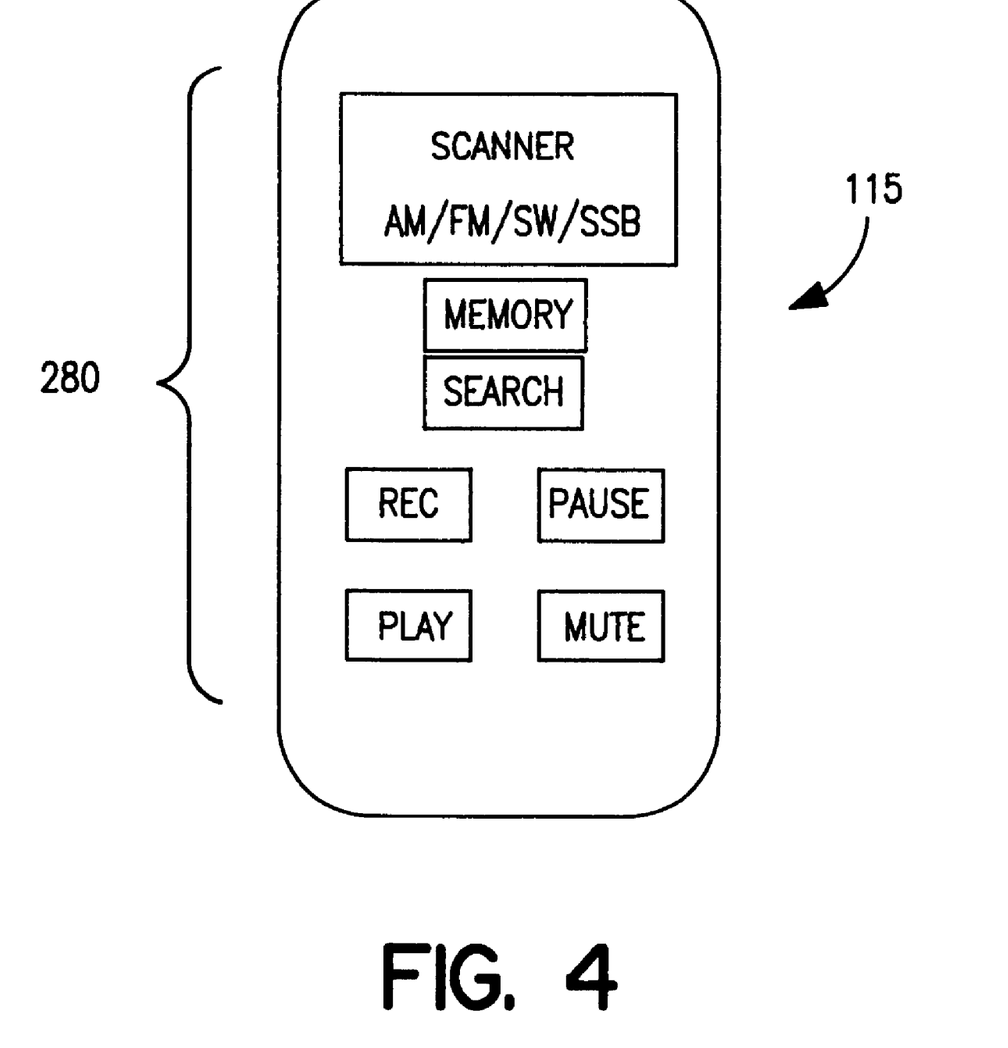
FIG. 4 is a front view of an embodiment of a remote control for operating the EPRVCR of FIG. 1.

FIG. 4 illustrates the remote control 115 as discussed above with respect to FIG. 1. Control buttons 280, which duplicate many of the functions available on the front of the EPRVCR 100. The control buttons 280 include functions: play, mute, record, pause, search, memory and a scanner of the input source, namely AM/FM/SW/SSB. The remote control 115 is preferably operated via the infrared transmission link 120 with the EPRVCR 100 illustrated in FIG. 1 by a dashed line.

Figure 5:
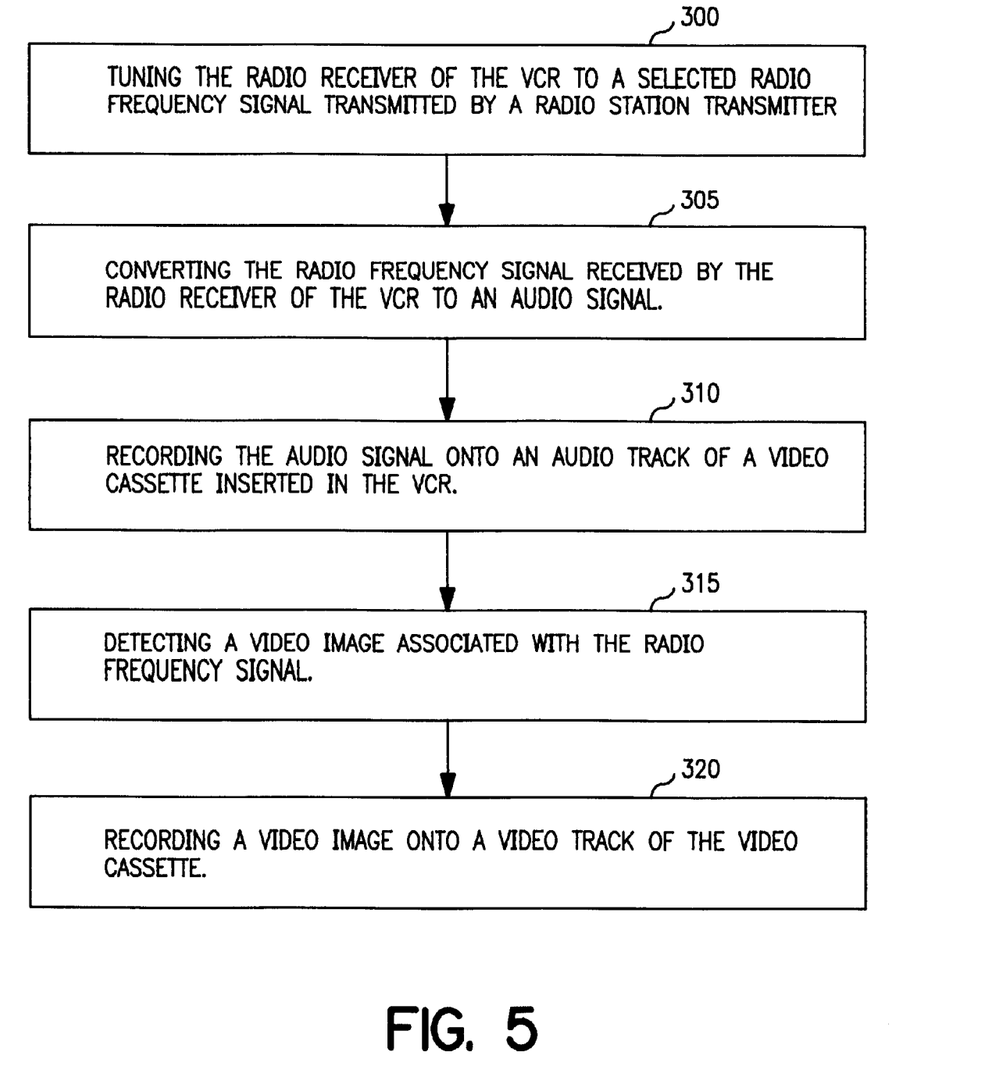
FIG. 5 is a flowchart illustrating an embodiment of a method of operating the EPRVCR of FIG. 1.

FIG. 5 is a flowchart of an embodiment of a method for operating the EPRVCR 100 of the present invention. In the embodiment of the method illustrated, the method of recording a video image and a radio signal on a single recording media using a video cassette recorder having a tuner capable of receiving a radio frequency signal transmitted by a radio station transmitter. As indicated by block 300, the method includes a step of tuning the radio receiver of the VCR to a selected radio frequency signal transmitted by a radio station transmitter. Another step 305 includes converting the radio frequency signal received by the radio receiver of the VCR to an audio signal. A further step 310 includes recording the audio signal onto an audio track of a video cassette inserted in the VCR. Step 315 includes detecting a video image associated with the radio frequency signal. Finally, step 320 includes recording a video image onto a video track of the video cassette. A further step includes playing the audio and visual image through the VCR for playback and display on a monitor.

The embodiment of the EPRVCR 100 of the present invention described above integrates a VHS format cassette transport having 19 micron head technology with a worldband radio. Both share a common microprocessor/controller. The EPRVCR 100 permits uninterrupted hi-fi recordings of radio signals as well as other hi-fi audio sources via the auxiliary audio inputs for up to 9 hours using a 180 minute VHS cassette. This is accomplished by running the cassette tape in the EP (extended play) mode. Further, the dynamic range and signal-to-noise ratio of the VHS format is superior to the audio cassette format discussed above and represents a significant improvement over such technology.

In addition, the EPRVCR may utilize the unused video track on the video cassette to implement what is termed radio vision. This may be done in at least two different ways.

First, a blank video cassette may be preformatted with video information only. This cassette is referred to as a radio vision cassette. For example, the video information may include video and/or still data. The video enriched blank VHS cassette, the radio vision cassette, may be sold to a user by a retailer. The user may then record a radio audio program onto the radio vision cassette having the prerecorded video. This allows the option of outputting the radio vision signal, combined audio and video, to the video monitor 105. As an audio recording (for example, a radio show or a CD) is played back, the prerecorded video image can be viewed as desired. The 19 micron heads provide hi-fi video images even when recorded in the EP mode.

A second method of implementing the video track on a video cassette is to provide radio vision video images broadcast on the radio band subcarrier or sideband simultaneously with the radio signal on the baseband. The video images are encoded and recorded real time onto the standard blank VHS cassette using the EPRVCR 100. The recorded composite radio/video data signal can be played back using the radio vision output 265 connected via a cable to the optional monitor 105.

In an alternative embodiment, a blank radio vision cassette may be purchased so that the user can record his own video images. The user may also record the radio broadcast on the audio track of the radio vision cassette. During subsequent playback of the radio vision cassette, the video and radio audio would be played back simultaneously. For example, the user may tape video of Hawaiian landscapes and then record a radio program overnight on the radio vision cassette. The user may then view the Hawaiian landscapes while listening to the radio program at a later convenient time.

In addition, as a promotional item, an advertiser may distribute, free of charge, the radio vision cassette with prerecorded video tracks. The audio track would be blank so that the user could record whatever audio desired. However, during playback the visual image supplied by the advertiser would be displayed along with the audio taped by the user. Such an opportunity for advertising could be quite desirable.

Thus, the EPRVCR provides the capability for using a blank VHS tape and recording a radio program on it much like using an insert dub mode on a standard VCR. The user re-records the audio track while leaving the video image on the video track of the VHS tape. This is similar to video taping a wedding and redubbing the sound using the insert dub mode. In this manner a pleasing audio track could be laid down to cover up background noise while videotaping the event.

In an embodiment, the EPRVCR could be set to automatically listen for a certain program broadcast at a predetermined time. Much like VCR Plus7 type programming for TV, an audio version of the programming lineup could be provided from the radio station. The user could then pick a selection from a menu, use the on-screen programming of the EPRVCR, and preset the recording of the desired radio program, much like taping a favorite TV show.

As set forth above, the radio program is provided with an audio component and a video or visual component in the sideband of the audio component. The video image may be a snapshot image, a still, etc. as well as information corresponding to the audio program or a toll-free phone number or Internet address to call for additional information. Also, a repeating series of slide images or a picture of the person talking during the audio portion could be provided.

Thus, in an embodiment, a user could be listening to the audio portion of a track while away from the EPRVCR and return to the room to view the video portion upon hearing about something of interest. The user could then see the accompanying visual image that is provided for the audio portion.

Another capability of the EPRVCR is provided for use in the newspaper industry. Newspapers or other periodicals could obtain transmission capabilities at a radio channel whereby the newspaper image is transmitted on the sideband of the radio channel. A person desiring the periodical then buys a descrambler, a pin key or some other type of access device instead of buying a subscription to the periodical. The periodical is downloaded on a sideband overnight so that the user views it in the morning much like a morning paper. Upon incorporating a computer or other controller and appropriate software, the user could sort through sections of the paper to find the favorite section (such as a sports page) by using an indexing search and fast forwarding through the video images of the paper that were transmitted overnight on the sideband of the radio channel for specific viewing the next morning. Such a usage of the EPRVCR provides a multimedia system for radio and newspaper to compete against TV stations.

In addition, the video images may further be computer enhanced so that pan and zoom capabilities are provided to smoothly zoom into sections of the paper that had been downloaded on the subcarrier the night before. The user then conveniently zooms in on the portion of the paper of interest.

A standard hi-fi VCR is already configured to basically operate in the manner described above. The standard VCR needs to be programmed to default to the mode of operation (i.e., the EPRVCR would be in a mode to record a radio channel and accompanying video input) instead of searching through a detailed recording menu to select it. Also, the tuner in the VCR could use DDFS (Direct Digital Frequency Synthesis) such that the read only memory (ROM) could be extended to pull in approximately 500 radio stations.

An additional feature and method of using the EPRVCR 100 provides a radio marketing benefit. This feature is an "auto channel boot." For example, an advertiser could prerecord commercial content onto a blank radio vision cassette video track and encode the tape header with the radio station's frequency using a radio vision tape encoder. This tape could then be given to a listener/customer as a radio vision promotional item. When inserted into the EPRVCR 100 the encoded "auto channel boot" will tune to that station. The user recording the audio receives the station's visual data stream which may be commercials, videos, stills, slide shows, images of products people or places and thereafter records a radio program from that station onto the promotional tape. The end result is a composite audio and video radio vision recording.

The auto channel boot may also be transmitted over the side band. In this manner, the EPRVCR would be switched to the channel designated in the auto channel boot. This would allow radio station advertisers to provide an automatic switching of the user to a channel selected by the advertiser.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method of recording a video image and a corresponding audio signal on a single recording media using a video cassette recorder (VCR) having a radio receiver, the method comprising the steps of:

tuning the radio receiver of the VCR to a selected radio frequency signal transmitted by a radio station transmitter;

converting the radio frequency signal received by the radio receiver of the VCR to an audio signal;

recording the audio signal onto an audio track of a video cassette inserted in the VCR;

converting a frequency subcarrier sideband video signal of the radio frequency signal received by the radio receiver of the VCR to a video signal; and recording the video signal onto a video track of the video cassette.

2. The method of claim 1 further comprising the step of:
playing back the recorded audio signal and video signal from the video cassette.

3. The method according to claim 1, further comprising the step of receiving in the sideband of the radio frequency signal an audio channel boot indicating a channel to which to tune the VCR.

4. The method according to claim 3, further comprising the step of automatically tuning the radio receiver of the VCR to a channel selected by the audio channel boot.

5. The method according to claim 4, wherein the step of receiving an audio channel boot comprises receiving an audio channel boot comprising a radio station frequency.

6. A method of transmitting and receiving a radio frequency composite signal containing a video signal and an audio signal, the method comprising the steps of:

providing a video cassette recorder having a radio tuner for receiving radio frequency audio signals;

broadcasting a radio frequency audio signal on a preselected radio frequency;

broadcasting a radio frequency subcarrier sideband video signal on a subcarrier sideband of the preselected radio frequency;

receiving the radio frequency audio and subcarrier sideband video signal at the radio tuner of the video cassette recorder;

converting the radio frequency audio and video signals to audio and video signals capable of being recorded on audio and video tracks of a recording media by the video cassette recorder; and recording the radio frequency audio and video signals onto the recording medium inserted in the video cassette recorder.

7. The method of claim 6, further comprising the step of recording the audio and video signals using the video cassette recorder.

8. The method of claim 6, further comprising the step of recording the audio and video signals onto a single video cassette using the video cassette recorder.

9. The method of claim 6, further comprising the step of:
playing the audio and video signals through the video cassette recorder for display on a monitor.

10. The method of claim 6, further comprising the steps of:

providing a video monitor and an audio speaker; and playing the audio and video signals on the video monitor via the video cassette recorder.

11. The method of claim 6, wherein the step of broadcasting a radio frequency video signal on the subcarrier sideband comprises transmitting periodical text images.

12. The method of claim 11, further comprising the steps of:

incorporating an indexing code for the periodical text images into the transmission of the radio frequency video signal, and accessing a periodical text image using the video cassette recorder to locate the index identifier.

* * * * *